US011538167B2

(12) United States Patent
Chen et al.

(10) Patent No.: US 11,538,167 B2
(45) Date of Patent: Dec. 27, 2022

(54) METHOD FOR DETERMINING SEVERITY OF SKIN DISEASE BASED ON PERCENTAGE OF BODY SURFACE AREA COVERED BY LESIONS

(71) Applicant: Janssen Biotech, Inc., Horsham, PA (US)

(72) Inventors: Yanqing Chen, San Diego, CA (US); Charles Tang, Berkeley, CA (US); Ernesto J. Munoz-Elias, Rancho Santa Fe, CA (US)

(73) Assignee: JANSSEN BIOTECH, INC., Horsham, PA (US)

( * ) Notice: Subject to any disclaimer, the term of this patent is extended or adjusted under 35 U.S.C. 154(b) by 0 days.

(21) Appl. No.: 17/115,036

(22) Filed: Dec. 8, 2020

(65) Prior Publication Data

US 2021/0174512 A1 Jun. 10, 2021

Related U.S. Application Data

(60) Provisional application No. 62/945,642, filed on Dec. 9, 2019.

(51) Int. Cl.
*G06T 7/11* (2017.01)

(52) U.S. Cl.
CPC ...... *G06T 7/11* (2017.01); *G06T 2207/20081* (2013.01); *G06T 2207/20084* (2013.01); *G06T 2207/30088* (2013.01); *G06T 2207/30096* (2013.01)

(58) Field of Classification Search
CPC . G06T 2207/20081; G06T 2207/20084; G06T 2207/30088; G06T 2207/30096; G06T 7/0014; G06T 7/11
See application file for complete search history.

(56) References Cited

U.S. PATENT DOCUMENTS

| 7,454,046 | B2* | 11/2008 | Chhibber | A61B 5/444 |
| | | | | 382/128 |
| 7,477,767 | B2* | 1/2009 | Chhibber | A61B 5/442 |
| | | | | 382/128 |
| 8,155,413 | B2* | 4/2012 | Chhibber | A61B 5/4875 |
| | | | | 382/128 |

(Continued)

OTHER PUBLICATIONS

A Bozek, A. Reich (2017) Adv Clin Exp Med. Aug. 2017;26(5):851-856.

(Continued)

*Primary Examiner* — Bobbak Safaipour
(74) *Attorney, Agent, or Firm* — Riverside Law LLP

(57) ABSTRACT

An image processing method is provided that automatically calculates Body Surface Area (BSA) score using machine learning techniques. A Felzenszwalb image segmentation algorithm is used to define proposed regions in each of a plurality of training set images. The training set images are oversegmented, and then each of the proposed regions in each of the plurality of oversegmented training set images are manually classified as being a lesion or a non-lesion. A Convolutional Neural Network (CNN) is then trained using the manually classified proposed regions in each of the plurality of training set images. The trained CNN is then used on test images to calculate BSA scores.

13 Claims, 8 Drawing Sheets

(56) References Cited

U.S. PATENT DOCUMENTS

| | | | | |
|---|---|---|---|---|
| 8,260,010 | B2* | 9/2012 | Chhibber | A61B 5/4875 382/128 |
| 10,853,409 | B2* | 12/2020 | Wang | G06T 7/0012 |
| 11,200,416 | B2* | 12/2021 | Wang | G06T 7/0012 |
| 2007/0064985 | A1* | 3/2007 | Chhibber | A61B 5/443 382/128 |
| 2007/0064989 | A1* | 3/2007 | Chhibber | A61B 5/444 382/128 |
| 2009/0136101 | A1 | 5/2009 | Chhibber | |
| 2012/0237127 | A1* | 9/2012 | Kohli | G06V 20/00 382/180 |
| 2013/0018271 | A1* | 1/2013 | Mohamad Hani | G06T 7/60 600/476 |
| 2014/0050391 | A1* | 2/2014 | Angelova | G06T 7/194 382/173 |
| 2014/0316235 | A1 | 10/2014 | Davis | |
| 2015/0036921 | A1* | 2/2015 | Lu | G06T 7/0002 382/164 |
| 2015/0206022 | A1* | 7/2015 | Radha Krishna Rao | G06V 10/764 382/128 |
| 2015/0339816 | A1* | 11/2015 | Yu | G06T 7/0012 382/128 |
| 2017/0231550 | A1* | 8/2017 | Do | G06T 7/11 382/128 |
| 2019/0108912 | A1* | 4/2019 | Spurlock, III | G16H 50/20 |
| 2019/0370972 | A1* | 12/2019 | Bagci | G06N 3/084 |
| 2021/0133958 | A1* | 5/2021 | Chen | G06V 10/764 |
| 2021/0174512 | A1* | 6/2021 | Chen | G06T 7/0014 |
| 2022/0095998 | A1* | 3/2022 | Gareau | A61B 5/0075 |
| 2022/0222816 | A1* | 7/2022 | Carnell | G06T 7/0012 |

OTHER PUBLICATIONS

A. Krizhevsky, I. Sutskever, G.E. Hinton (2012), "Imagenet classification with deep convolutional neural networks," Advances in Neural Information Processing (2012).

C. Fink, L. Uhlmann, C. Klose, et al. (2018) Automated, computer-guided PASI measurements by digital image analysis versus conventional physicians' PASI calculations: study protocol for a comparative, single-centre, observational study BMJ Open 2018;8:e018461.

D..Liu, B. Soran, G. Petrie, and L. Shapiro. A review of computer vision segmentation algorithms. Lecture notes, 53, 2012.

P.F. Felzenszwalb and D.P. Huttenlocher (2004) Efficient Graph-Based Image Segmentation. International Journal of Computer Vision 59(2), 167-181.

S. Santurkar, D. Tsipras, A. Ilyas, A. Madry (2018) How Does Batch Normalization Help Optimization? Advances in Neural Information Processing (NeurIPS), 2018.

* cited by examiner

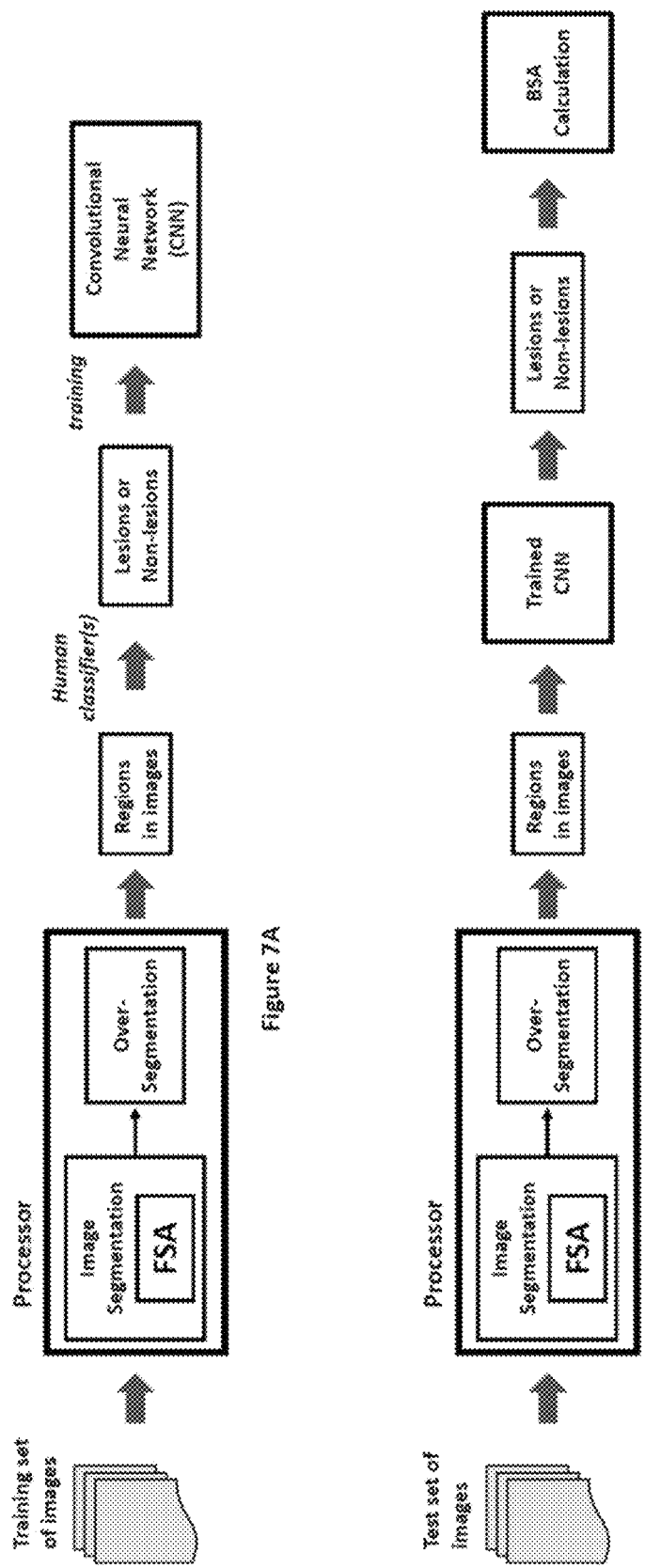

METHOD FOR DETERMINING SEVERITY OF SKIN DISEASE BASED ON PERCENTAGE OF BODY SURFACE AREA COVERED BY LESIONS

CROSS-REFERENCE TO RELATED APPLICATIONS

This application claims the benefit of U.S. Provisional Application Ser. No. 62/945,642, filed 9 Dec. 2019. The entire content of the aforementioned application is incorporated herein by reference in its entirety.

BACKGROUND OF THE INVENTION

Disease severity evaluations of skin diseases such as Psoriasis involves calculating the percentage of Body Surface Area that is covered by lesions and inflammation (i.e., BSA score). Hereafter, lesions and inflammation are collectively referred to as "lesions." BSA is the measured or calculated surface area of a human body.

Psoriasis is an autoimmune skin disease manifested as red and inflammatory areas that is distinct from healthy normal skin. An important part of disease severity measurements for Psoriasis is to monitor what percentage of Body Surface Area is covered by inflamed areas called "lesions." For Plaque Psoriasis, two major disease measurements are BSA and PASI (Psoriasis Area and Severity Index), both of which involve calculating a percentage score that is used to monitor the disease progression and treatment effect (A Bozek, A. Reich (2017). The reliability of three psoriasis assessment tools: Psoriasis area and severity index, body surface area and physician global assessment. Adv Clin Exp Med. 2017 Aug.; 26(5):851-856. doi: 10.17219/acem/69804). Currently these percentages are often estimated in physician's office by a dermatologist or nurse. A major problem with current Psoriasis disease scores is that they are inexact and coarse estimations with human biases. Furthermore, the process to calculate the percentages to get an overall PASI score is tedious and time consuming. Another clinical need is that there is currently no BSA measures for Guttate Psoriasis in which the body areas affected are large and covered by numerous inflammatory lesions ranging from 2 to 10 mm in size, making it difficult to measure by eyesight.

Accordingly, there is a need for a more objective and quantitative way to monitor the skin inflammation using computational methods. The present invention fulfills such a need.

SUMMARY OF THE INVENTION

An image processing method is provided that automatically calculates BSA score using machine learning techniques. A Felzenszwalb image segmentation algorithm is used to define proposed regions in each of a plurality of training set images. The training set images are oversegmented ("over segmented" or "over-segmented"), and then each of the proposed regions in each of the plurality of oversegmented training set images are manually classified as being a lesion or a non-lesion. A Convolutional Neural Network (CNN) is then trained using the manually classified proposed regions in each of the plurality of training set images. The trained CNN is then used on test images to calculate BSA scores. Also included in the present invention is a device (or computer system) driven by computer instructions that is used in connection with the method, e.g., computer-related device or medium for performing the method as known in the relevant art.

BRIEF DESCRIPTION OF DRAWINGS

The patent or application file contains at least one drawing executed in color. Copies of this patent or patent application publication with color drawings will be provided by the Office upon request and payment of the necessary fee.

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIGS. 7A and 7B are schematic diagrams of system software and hardware for implementing FIG. 6.

DETAILED DESCRIPTION OF THE INVENTION

Certain terminology is used herein for convenience only and is not to be taken as a limitation on the present invention.

I. Overview

Figure 6:
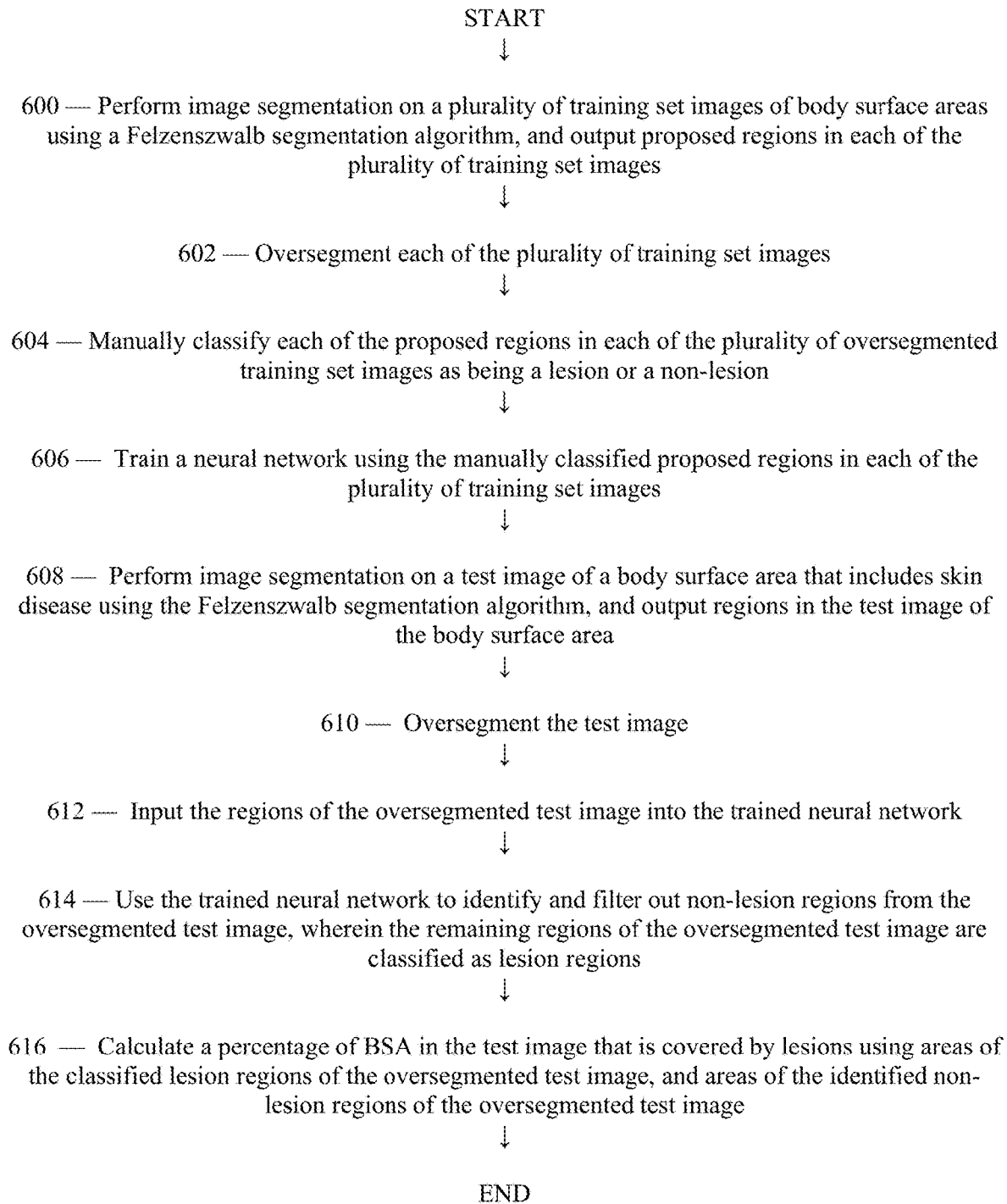
FIG. 6 is a flowchart of a computerized method for determining severity of skin disease based on percentage of BSA that is covered by lesions, in accordance with one preferred embodiment of the present invention.

FIG. 6 is a flowchart of a computerized method for determining severity of skin disease (e.g., psoriasis) based on percentage of BSA that is covered by lesions. FIGS. 7A and 7B are schematic diagrams of system software and hardware for implementing FIG. 6.

Referring to FIGS. 6, 7A, and 7B, the method operates as follows:

Step 600: Perform image segmentation on a plurality of training set images of body surface areas using a Felzenszwalb segmentation algorithm (FSA), and output proposed regions in each of the plurality of training set images. Each of the plurality of training set images of body surface areas include skin disease. This image segmentation step is performed by processor 700 shown in FIG. 7A.

Step 602: Oversegment each of the plurality of training set images. This step is also performed by the processor 700.

Step 604: Manually classify each of the proposed regions in each of the plurality of oversegmented training set images as being a lesion or a non-lesion. This step is performed by one or more human classifiers 702 shown in FIG. 7A.

Step 606: Train a neural network using the manually classified proposed regions in each of the plurality of training set images. This step is performed by neural network 704 shown in FIG. 7A.

Step 608: Perform image segmentation on a test image of a body surface area that includes skin disease using the Felzenszwalb segmentation algorithm, and output regions in the test image of the body surface area. This image segmentation step is performed by processor 700' shown in FIG. 7B. The processor 700' may be the same, or different processor as the processor 700.

Step 610: Oversegment the test image. This step is also performed by the processor 700'.

Step 612: Input the regions of the oversegmented test image into the trained neural network, labeled as 704' in FIG. 7B because it is the same neural network as neural network 704 in FIG. 7A, except that it is now trained.

Step 614: Use the trained neural network 704' to identify and filter out non-lesion regions from the oversegmented test image, wherein the remaining regions of the oversegmented test image are classified as lesion regions.

Step 616: Calculate a percentage of BSA in the test image that is covered by lesions using areas of the classified lesion regions of the oversegmented test image, and areas of the identified non-lesion regions of the oversegmented test image. This step is performed in processor 700". The processor 700" may be the same, or different processor as the processor 700 or processor 700'.

II. Detailed Disclosure

The detailed disclosure below describes the experimental process that led to the present invention, and explains approaches that were more successful than others.

The present invention treats the body surface area calculation as an image segmentation problem. Image segmentation has become one of the cornerstone issues within computer vision and is defined as the process of partitioning digital images into multiple segments, thereby organizing image data into meaningful chunks. A series of image segmentation methods were investigated that can effectively calculate the body surface area of a patient's psoriasis disease. Preferred embodiments of the presently claimed invention use the Felzenszwalb image segmentation algorithm [3], and Convolutional Neural Networks (A. Krizhevsky, I. Sutskever, G. E. Hinton (2012) Imagenet classification with deep convolutional neural networks. Advances in Neural Information Processing (NeurIPS), 2012) as a false positive filter to improve upon the Felzenszwalb segmentation results.

Several image processing methods were tested to automatically calculate BSA score using machine learning techniques applied on 117 Guttate and Plaque Psoriasis images downloaded from the internet. In comparison to several other unsupervised segmentation methods, the Felzenszwalb image segmentation algorithm generated the highest percentages of correct segmentations of lesion versus non-lesion areas with 56% of images having a good segmentation while 44% of images are under or over segmented. To improve the segmentation results, a Convolutional Neural Network (CNN) was implemented, inspired by Visual Geometry Group (VGG) architecture to further filter out false positive lesions from the Felzenszwalb algorithm's proposed regions. Training data for the CNN were comprised of human curated datasets of lesional and nonlesional regions outputted from the Felzenszwalb algorithm. The CNN achieved a 90% 5-fold cross validation testing accuracy score in classifying between lesions and non-lesions. This CNN filter, applied alongside the Felzenszwalb algorithm, accurately segmented 77% of the training data or 67 out of the 86 guttate psoriasis images. This method is useful for digitizing disease severity measurements and remote monitoring of skin diseases such as Psoriasis for patients and physicians.

Image Data for Psoriasis

To gather the dataset, about 300 images of guttate psoriasis and 100 images of chronic plaque psoriasis were scraped from Google Images. Inaccurate and/or misleading image data were filtered out, leaving a final dataset of 86 guttate psoriasis images and 31 chronic plaque psoriasis images.

Psoriasis Image Segmentation Methods

Five different image segmentation algorithms were tested, all implemented using the scikit-learn and OpenCV library in Python. The five tested algorithms were Felzenszwalb, Quickshift, SLIC, Compact watershed, and Otsu's Thresholding algorithm (see a review in D. Liu, B. Soran, G. Petrie, and L. Shapiro. A review of computer vision segmentation algorithms. Lecture notes, 53, 2012). After visually inspecting a couple image examples, it became apparent that the Felzenszwalb method (P. F. Felzenszwalb and D. P. Huttenlocher (2004) Efficient Graph-Based Image Segmentation. International Journal of Computer Vision 59(2), 167-181) produced the most promising segmentation by far.

Figure 1:
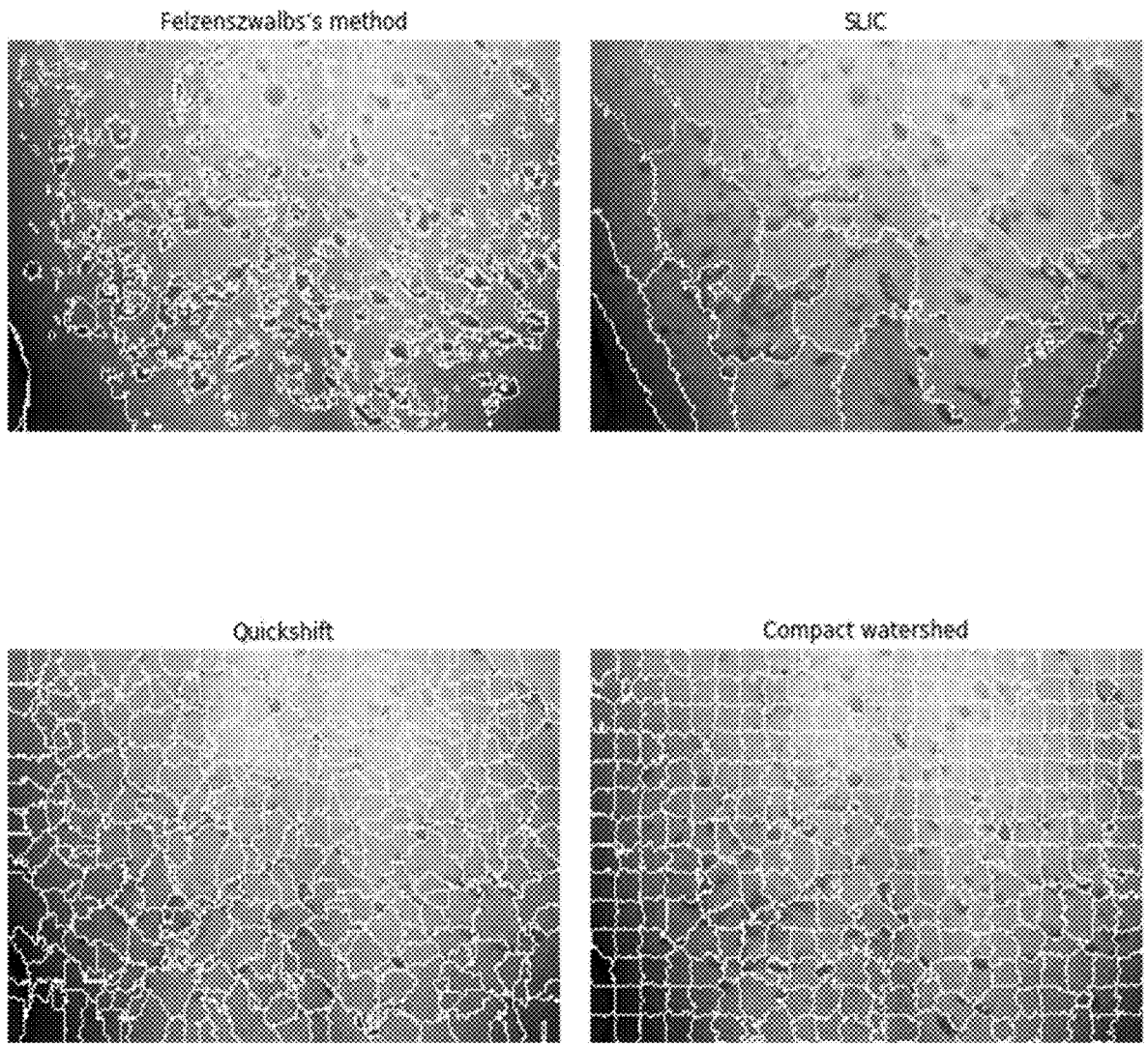
FIG. 1 illustrates Psoriasis Image segmentation using Felzenszwalb, Quickshift, SLIC, and Compact watershed methods.

FIG. 1 shows the output images of four different segmentation algorithms. Yellow boundaries mark the segmentation of a suggested (proposed) region by the algorithm. After these tests, it was decided to segment all images with the Felzenszwalb algorithm.

Psoriasis Segmentation and Binary Classification Filtering Algorithm

To enhance the Felzenszwalb segmentation results, a new algorithm was used based upon a convolutional neural network filter that removes false positives from the segmentation. This algorithm is inspired by and holds similarities to the region-based convolutional neural networks (R-CNNs) that currently have become the state of the art in tackling image segmentation problems. The algorithm operates as follows:

1. Train a neural network to distinguish between lesions and non-lesions among proposed regions from the Felzenszwalb segmentation algorithm.

2. Oversegment the image by increasing the k-value parameter to an optimal threshold (k=250).

3. Use the neural network to filter out the non-lesions proposed by the Felzenszwalb segmentation.

Oversegmenting the image in step 2 ensures that most lesions will be included inside the segmentation. Then, to filter out the excess non-lesions or false positives the pre-trained neural network from step 1 is used to distinguish non-lesion regions from lesion regions in step 3.

Training Data

The proposed regions outputted from the Felzenszwalb segmentation algorithm (with the k-value set to 250) were used to oversegment the image, thereby including as many true positive lesion regions as possible. Next, about 30 guttate psoriasis images were chosen, which generated around 3000 proposed region images. Then, each of the 3000 proposed regions were manually (human) classified as lesion or non-lesion. To verify the accuracy of this dataset, the process was repeated three times. Some of these non-lesions were easy to identify, including huge regions covering a lot of skin, black background areas, necklaces, noise, and the like. Other regions were harder to distinguish between lesion and non-lesion including regions that had shade, bad lighting, scars, and the like. A large source of error is believed to be attributed to the incongruencies in the dataset and these harder regions to classify as lesion versus non-lesion. This may be another explanation for why the binary classification results are still not close to the state-of-the-art results seen in the Modified National Institute of Standards and Technology (MNIST) or Canadian Institute for Advanced Research (CIFAR) datasets.

Binary Classification Neural Network Experiments

To train the neural network models a procedure was followed similar to the one described below:

First, all proposed region inputs were preprocessed by resizing all of the images to a certain constant pixel size using the cubic interpolation method from the opencv library. Next, different parameters of the neural network model were changed including model architecture (dense neural network vs convolutional neural network, hidden layer sizes, batch normalization), parameters (learning rate), and input image interpolation pixel sizes (4×4, 8×8, 16×16, 32×32, 64×64). Finally, all of the models were tested with an 80-20 train-test data split ratio to determine the accuracy, log-loss, and mean squared error scores of the respective models. This means that 80% of the data was used to build the model and 20% of the remainder data (which was unseen by the model) was used to evaluate the predictive strength of the model.

The final CNN model that was chosen was inspired by the VGG-architecture, did not use batch normalization, had smaller hidden layers (both in number of hidden layers and width of hidden layers), had a learning rate of 1e-4, and used the Adam optimizer. (Adam is an adaptive learning rate optimization algorithm that's been designed specifically for training deep neural networks.) To ensure the accuracy of the final model, this model was tested with 5-fold cross validation and got an average 5-fold training accuracy score of 94% and an average 5-fold testing accuracy score of 90%.

Things that improved Accuracy Results

There were three approaches that greatly improved the binary classification accuracy of the neural network:

The first approach was to cubic interpolate the shape of the input images to a constant 16×16 pixel size. At first, when the images were set to size 64×64, the classification accuracy hovered at extremely low rates of 60%. As the size of images was lowered, it was discovered that a standard small dense neural network would achieve better and better classification performances until one reached an optimal 16×16 image size. A reason for this may be that most proposed regions were around 16×16 sizes. Thus, interpolating more information may cause the region to gain misleading information and interpolating less information may cause the region to lose valuable information.

The second approach was to use convolutional neural networks, as opposed to dense neural networks. It is well known that convolutional neural networks perform better than dense neural networks in image classification tasks due to a myriad of reasons.

The third approach was that "less is more" when building convolutional neural network model architectures. For instance, when the hidden layer sizes were reduced, faster training times and more accurate testing validation scores were obtained. Specifically, reducing the first dense layer hidden size, which thereby reduces a significant number of parameters, was particularly important. This may be due to the fact that an excess of parameters may prevent the model from generalizing well and cause overfitting effects. This overfitting issue can best be seen in a near 10% accuracy loss between training and testing validation scores in large VGG-models.

Things that had No Effect or Worsened Segmentation Results

Several approaches did not improve accuracy results. More specifically, three approaches had negligible or negative effects on the model.

First, adding batch normalization layers as seen in the VGG models was believed improve results, but as seen in certain papers (S. Santurkar, D. Tsipras, A. Ilyas, A. Madry (2018) How Does Batch Normalization Help Optimization? Advances in Neural Information Processing (NeurIPS), 2018), batch normalization does not seem to improve classification accuracy in all cases.

Second, adjusting the learning rate did not provide performance gains. After testing the rates of 0.01, 0.001, 0.0003, and 0.0001 it was found that learning rate gives a negligible difference in performance results between 0.001, 0.0003, and 0.0001 learning rate parameters.

Third, deeper and wider network did not increase the accuracy of the model. The larger dense neural network models and convolutional neural network models seemed to do worse by up to even 10% on cross validation testing than the simple small VGG-models that was tried. This seems to support the founding principles of the agile development principle—simplicity.

Results and Discussion i. Image Segmentation Algorithms Benefits and Drawbacks

After testing a small sample of images upon the five different algorithms, it became clear that the Felzenszwalb algorithm had far superior results than the other five unsupervised algorithms, as shown in FIG. 1. An important characteristic of this method is its ability to preserve detail in low-variability image regions while ignoring detail in high-variability regions. It is also fast (<1 sec for 512×512 image) with runtime O (n log n) where n is number of pixels. Based upon these observations the Felzenszwalb method was chosen to be the main method that was applied for Psoriasis images.

ii. Felzenszwalb Image Segmentation Scoring Metric and Results

Figure 2:
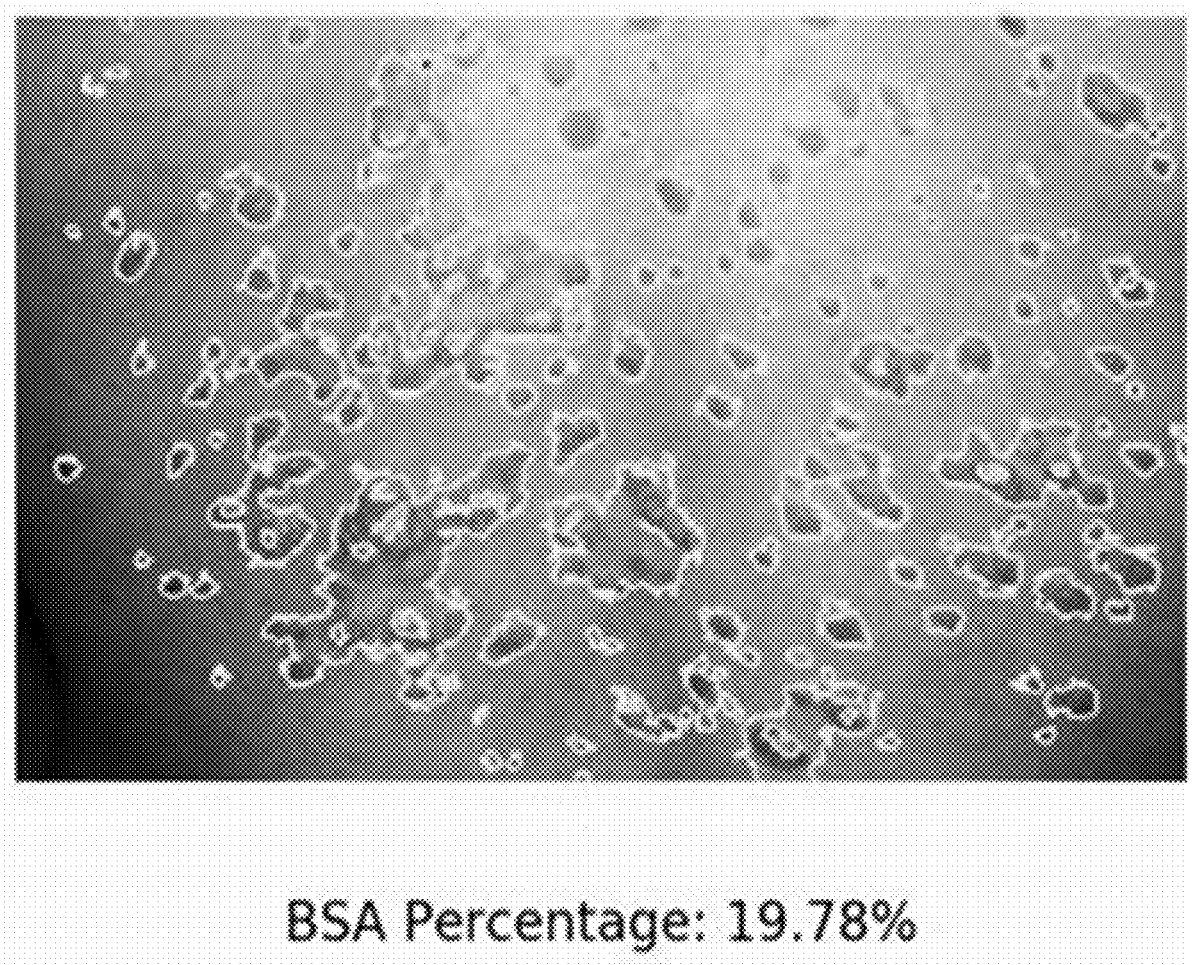
FIG. 2 illustrates a Psoriasis image correctly segmented by the Felzenszwalb method.

FIG. 2 shows an example of a good image segmentation. A good image segmentation is defined as any image segmentation that did not miss any clearly significant lesional parts that a typical doctor should have classified.

Figure 3:
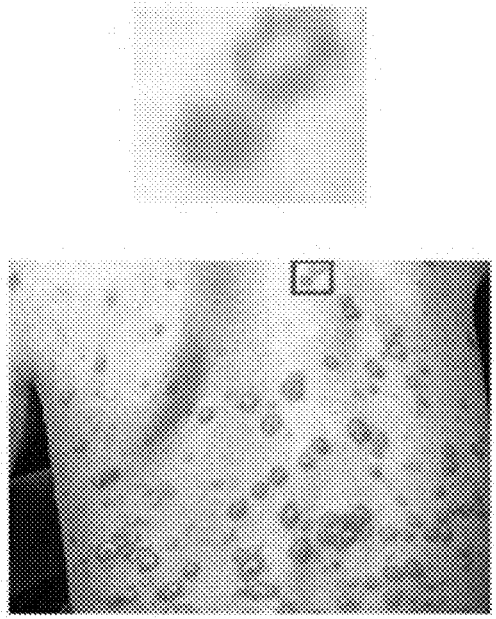
FIG. 3 illustrates three different types of inaccurately segmented Psoriasis images: under-segmented, over-segmented and a whole-image segmented.
Figure 3:
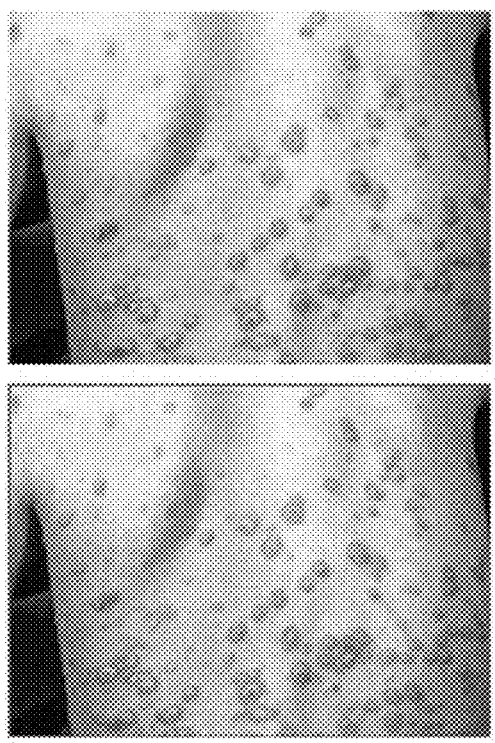
Figure 5A:
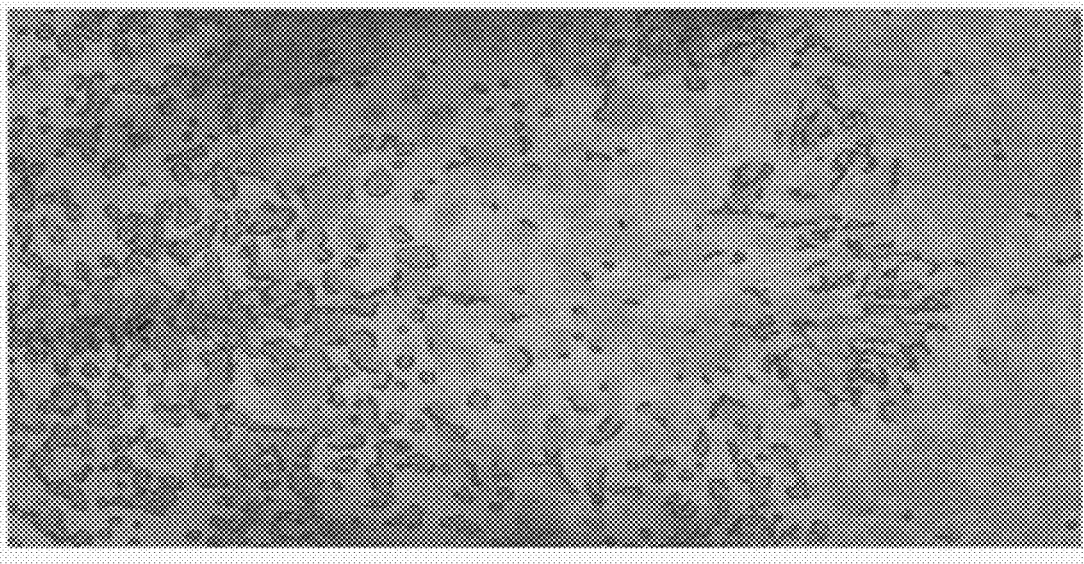
FIG. 5A illustrates under segmentation of an image.
Figure 5B:
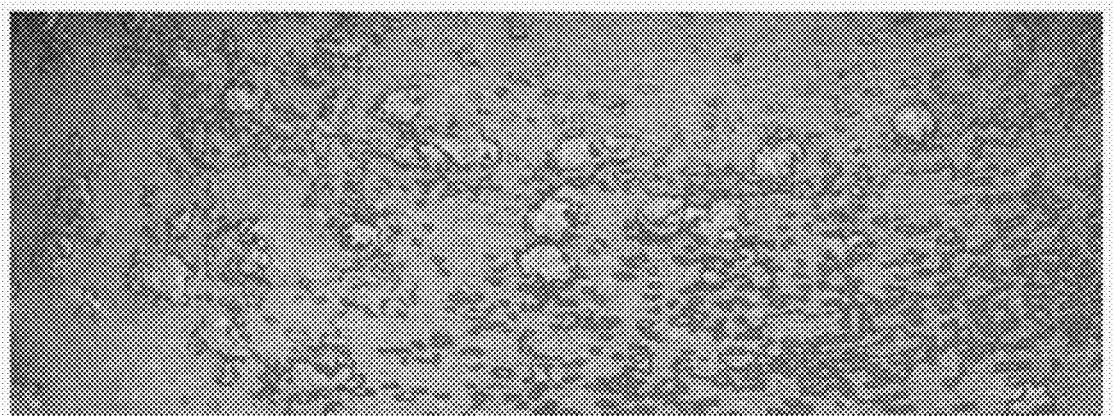
FIG. 5B illustrates oversegmentation of an image.

FIG. 3 shows three examples of inaccurate image segmentations. The first image is an example of an under segmented region. In order to reduce this problem, one should decrease the k-value parameter. The second image is an example of an over segmented region. In order to alleviate this issue, one should increase the k-value parameter. The last example is an instance of huge regions being classified as lesions. In order to alleviate this, one should increase the k-value parameter. FIGS. 5A and 5B also show examples of under segmentation and oversegmentation.

The baseline Felzenszwalb algorithm was able to segment 49 out of 88 input images with a good segmentation, 30 out of 88 input images were under segmented, and 9 out of 88 input images were over segmented. BSA score calculations were generated at the end of each segmentation result.

iii. Neural Network Based Filtering Results 25 different neural network models were tested with different parameters, architects, and input sizes. Test accuracies of each models were calculated. Setting lower image sizes, choosing smaller VGG-based Convolutional Neural Networks, and learning rates of 1e-4 produces the best model with the highest test accuracy of 0.9.

iv. Convolutional Neural Network Filter and Felzenszwalb Image Segmentation Results After implementing Felzenszwalb image segmentation filtered by the convolutional neural network, 67 out of 86 images provided good segmentation, 16 out of 86 images with an under segmentation, and 3 out of 86 images with an oversegmentation. Two input images were removed from the original Felzenszwalb image segmentation set due to inaccurate representations of guttate psoriasis. An example of the convolutional neural network improving segmentation results can be seen in the images of FIG. 4.

Figure 4:
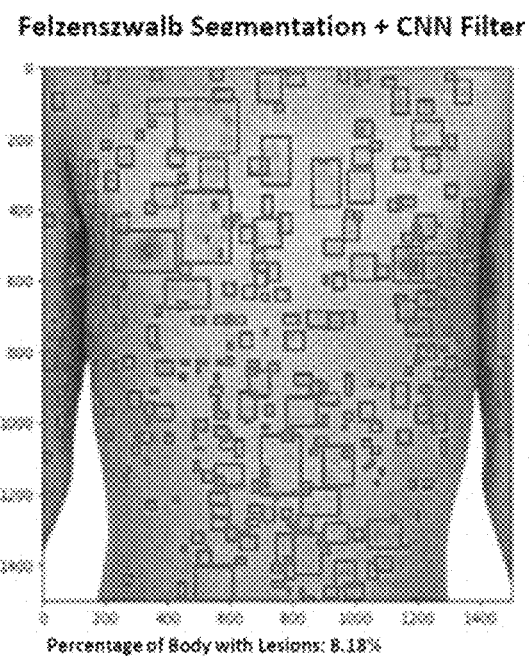
FIG. 4 illustrates how a CNN filter improves Felzenszwalb segmentation results.
Figure 4:
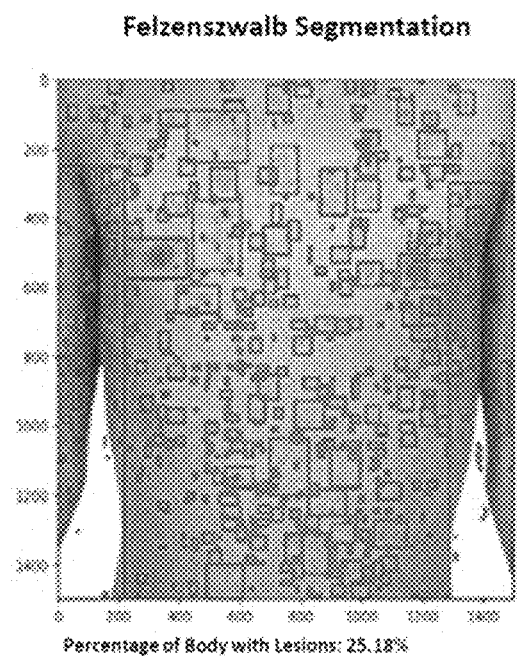

In the image on the left of FIG. 4, the convolutional neural network was able to filter out the large regions on the left side of the arm, all background white regions, and many small noise regions which were manually classified as non-lesions. With better training data and more extensive training, the neural network model can achieve even better filtering results and be used as an effective complement with the Felzenszwalb segmentation algorithm to remove false positive non-lesions.

CONCLUSION

In retrospect, it was found that the Felzenszwalb image segmentation algorithm produced a good baseline diagnosis algorithm that could effectively calculate the body surface area of lesions for a patient. It was also discovered that convolutional neural networks could classify with great accuracy between proposed lesion and non-lesions from the Felzenszwalb segmentation outputs when given a good training dataset. Combining these two results, it was shown that the Felzenszwalb image segmentation algorithm combined with a convolutional neural network filter does a great baseline diagnosis by calculating the image segmentation and thereby body surface area score for the psoriasis disease.

The BSA calculation methods described above may be used to generate a digitized Psoriasis disease score calculation system. For example, by training similar convolutional neural networks with 5 input images of front body, back, front leg, back leg, and head regions to automating the full PASI scoring system may output a severity index PASI score between 0-72. Such computer systems, such as proposed recently in (C. Fink, L. Uhlmann, C. Klose, et al (2018) Automated, computer-guided PASI measurements by digital image analysis versus conventional physicians' PASI calculations: study protocol for a comparative, single-centre, observational study BMJ Open 2018; 8:e018461. doi: 10.1136/bmjopen-2017-018461), can assist doctors in creating better, faster, and more informed decisions in diagnosis and monitoring of skin diseases such as Psoriasis.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:
1. A computerized method for determining severity of skin disease based on percentage of body surface area (BSA) that is covered by lesions, the method comprising:
   (a) performing image segmentation on a plurality of training set images of BSA's using a segmentation algorithm, wherein each of the plurality of training set images of BSA's include skin disease, the image segmentation performed using the segmentation algorithm outputting proposed regions in each of the plurality of training set images;
   (b) classifying each of the proposed regions as being a lesion or a non-lesion;
   (c) training a neural network using the classified proposed regions in each of the plurality of training setimages;
   (d) performing image segmentation on a test image of a BSA that includes skin disease using the segmentation algorithm, the image segmentation performed using the segmentation algorithm outputting regions in the test image of the BSA;
   (e) inputting the regions of the test image into the trained neural network;
   (f) using the trained neural network to identify and filter out non-lesion regions from the test image, wherein the remaining regions of the test image are classified as lesion regions; and
   (g) calculating a percentage of BSA in the test image that is covered by lesions using areas of the classified lesion regions of the test image, and the areas of identified non-lesion regions of the test image.

2. The method of claim 1 wherein the training set images and the test image are both oversegmented.

3. The method of claim 1 wherein the neural network is a convolutional neural network.

4. The method of claim 1 wherein prior to the training step (c), resizing the plurality of regions of the training set images to an image interpolation size of about 16×16 pixels, and prior to step (e), resizing the regions of the test image to an image interpolation size of about 16×16 pixels.

5. The method of claim 1 wherein the skin disease is psoriasis.

6. A computer system comprising a non-transitory computer-readable medium with instructions stored thereon, which when executed by a processor, perform steps comprising the method of claim 1.

7. The method of claim 1, wherein the segmentation algorithm is a Felzenszwalb segmentation algorithm.

8. The method of claim 1, wherein step (b) comprises the steps of:
   oversegmenting each of the plurality of training set images; and
   manually classifying each of the proposed regions in each of the plurality of oversegmented training set images as being a lesion or a non-lesion.

9. The method of claim 1, further comprising the step of oversegmenting the test image before inputting the regions of the test image into the trained neural network.

10. The method of claim 2, wherein the training set images and the test image are both oversegmented by increasing the k-value parameter to about 250.

11. The method of claim 8, wherein the segmentation algorithm is a Felzenszwalb segmentation algorithm.

12. The method of claim 9, wherein the segmentation algorithm is a Felzenszwalb segmentation algorithm.

13. The method of claim 8, further comprising the step of oversegmenting the test image before inputting the regions of the test image into the trained neural network.

* * * * *